(12) United States Patent
Du et al.

(10) Patent No.: US 11,983,109 B2
(45) Date of Patent: May 14, 2024

(54) AIR FREIGHT RATE DATA CACHING METHOD AND SYSTEM

(71) Applicant: TravelSky Technology Limited, Beijing (CN)

(72) Inventors: Jinfang Du, Beijing (CN); Lingbin Meng, Beijing (CN); Wen Wen, Beijing (CN); Chunsheng Ju, Beijing (CN); Bing Liu, Beijing (CN); Yongbo Fei, Beijing (CN)

(73) Assignee: TravelSky Technology Limited, Beijing (CN)

( * ) Notice: Subject to any disclaimer, the term of this patent is extended or adjusted under 35 U.S.C. 154(b) by 192 days.

(21) Appl. No.: 17/625,702

(22) PCT Filed: Jul. 8, 2020

(86) PCT No.: PCT/CN2020/100802
§ 371 (c)(1),
(2) Date: Jan. 7, 2022

(87) PCT Pub. No.: WO2021/004472
PCT Pub. Date: Jan. 14, 2021

(65) Prior Publication Data
US 2022/0374355 A1    Nov. 24, 2022

(30) Foreign Application Priority Data
Jul. 10, 2019 (CN) .......................... 201910620227.9

(51) Int. Cl.
*G06F 12/0802* (2016.01)
(52) U.S. Cl.
CPC ...... *G06F 12/0802* (2013.01); *G06F 2212/60* (2013.01)

(58) Field of Classification Search
CPC .. G06F 12/0802; G06F 2212/60; G06F 3/067; G06F 16/27; G06F 16/278;
(Continued)

(56) References Cited

U.S. PATENT DOCUMENTS

2003/0191812 A1* 10/2003 Agarwalla ............ H04L 69/329
709/212
2008/0301256 A1* 12/2008 McWilliams ....... G06F 12/0806
714/E11.178
(Continued)

FOREIGN PATENT DOCUMENTS

CN          1852318 A      10/2006
CN        100558089 C    * 11/2009
(Continued)

OTHER PUBLICATIONS

Bagui, Sikha. "Database to Provide Fault Tolerance and Scalability of Big Data on the Cloud". International Journal of Cloud Applications and Computing. Apr. 2015. <https://www.researchgate.net/publication/276122639_Database_Sharding_To_Provide_Fault_Tolerance_and_Scalability_of_Big_Data_on_the_Cloud>. (Year: 2015).*
(Continued)

*Primary Examiner* — Charles Rones
*Assistant Examiner* — Hewy H Li
(74) *Attorney, Agent, or Firm* — Wolf, Greenfield & Sacks, P.C.

(57) ABSTRACT

An air freight rate data caching method and system. The method includes converting air freight rate data into a data format of a first-level cache, and storing same in the first-level cache; performing, on the basis of a flight origin city and a flight destination city, data fragmentation on the air freight rate data stored in the first-level cache so as to generate fragmented data; and storing the fragmented data,
(Continued)

after same is validated, in a second-level cache. Each data node of the fragmented data cached in the second-level cache only includes part of the air freight rate data on which a fragmentation algorithm can be performed, and therefore, the horizontal expansion capacity of a cache system is improved relative to the case where cached data copies are all complete sets.

14 Claims, 4 Drawing Sheets

(58) Field of Classification Search
CPC ...... G06F 16/275; G06F 16/273; G06F 3/065; G06F 3/0646; G06F 11/2069; G06F 11/2056; G06F 11/2061
See application file for complete search history.

(56) References Cited

U.S. PATENT DOCUMENTS

| | | | |
|---|---|---|---|
| 2014/0089588 A1* | 3/2014 | Redoutey | G06F 16/24552 711/125 |
| 2016/0117255 A1 | 4/2016 | Marshall et al. | |
| 2017/0116125 A1* | 4/2017 | Sundaravaradan | G06F 16/24552 |
| 2019/0197174 A1 | 6/2019 | Kim et al. | |

FOREIGN PATENT DOCUMENTS

| | | | | |
|---|---|---|---|---|
| CN | 102117248 A | 7/2011 | | |
| CN | 103207919 A | 7/2013 | | |
| CN | 203520386 U | 4/2014 | | |
| CN | 105630982 A | 6/2016 | | |
| CN | 105630984 A | 6/2016 | | |
| CN | 105975638 A | 9/2016 | | |
| CN | 106030626 A | 10/2016 | | |
| CN | 106055640 A | 10/2016 | | |
| CN | 108804465 A | 11/2018 | | |
| CN | 108920099 A | 11/2018 | | |
| CN | 109947668 A | 6/2019 | | |
| CN | 110309184 A | 10/2019 | | |
| WO | WO-2012104229 A1 * | 8/2012 | ............ | G06Q 10/08 |
| WO | WO 2015/087036 A1 | 6/2015 | | |

OTHER PUBLICATIONS

"Shard (database architecture)". Wikipedia. Published Mar. 23, 2019. <https://en.wikipedia.org/w/index.php?title=Shard_(database_architecture)&oldid=889101139>. (Year: 2019).*

International Search Report and Written Opinion for International Application No. PCT/CN2020/100802, dated Oct. 10, 2020.

Extended European Search Report for European Application No. 20836693.0 dated Jan. 30, 2023.

* cited by examiner

AIR FREIGHT RATE DATA CACHING METHOD AND SYSTEM

FIELD

This Application is a national stage filing under 35 U.S.C. § 371 of International Patent Application Serial No. PCT/CN2020/100802, filed Jul. 8, 2020, which claims priority to Chinese Patent Application No. 201910620227.9, titled "METHOD AND SYSTEM FOR CACHING AIR FREIGHT RATE DATA", filed on Jul. 10, 2019 with the China National Intellectual Property Administration. The contents of these applications are incorporated herein by reference in their entirety.

BACKGROUND

Booking and buying air tickets online has become the most favorable choice for many travelers, due to rapid development of the Internet and online travelling market. Massive requests for retrieving and booking air tickets, as well as demands for releasing and committing air ticket prices in real time, have brought new challenges to systems for calculating or retrieving freight rates.

In conventional technology, data caching includes exporting all committed data from a database to generate a data file, then compressing the data file, and distributing the data file via data distribution network to a host for each data node, which provides a caching service. On detecting that the data file has reached a local data node, a data agent (which is a background program) decompresses the compressed data file, checks integrity of the decompressed data, and generates an index file based on configuration of the data. The data agent loads the data and the index file into a memory, in order to implement the data caching. When a user requests data on air ticket prices, an network service for calculation on air tickets forwards the user's request to the data agent, and the data agent searches the server's memory (shm), calculates an air ticket price, and returns data on the air ticket price to the user.

In conventional technology, all cached data copies are whole sets, and therefore the caching systems lack horizontal scalability. When a total amount of the cached data increases, memory resources would become a bottleneck that limits horizontal scalability of the caching systems.

SUMMARY

In view of the above, a method and a system for caching air freight rate data is provided according to embodiments of the present disclosure, in order to improve a horizontal scalability of caching systems.

A method for caching air freight rate data is provided, including:
  transforming the air freight rate data into a data format for a first-level cache, and storing the transformed air freight rate data into the first-level cache;
  performing data sharding on the air freight rate data stored in the first-level cache, based on an origin city and a destination city of a flight, to generate data shards, where: each data node of the data shards includes a copy of a whole set, of a part of the air freight rate data which is not dividable by a sharding algorithm, and one of subsets, of a part of the air freight rate data which is dividable by the sharding algorithm; and all the subsets, of the part of the air freight rate data which is dividable by the sharding algorithm, constitute a whole set of the part of air freight rate data which is dividable by the sharding algorithm; and
  committing the data shards, and storing the committed data shards into a second-level cache.

In an embodiment, the first-level cache is a Redis cluster.

In an embodiment, the second-level cache is a Linux kernel-level shared memory.

In an embodiment, performing the data sharding on the air freight rate data stored in the first-level cache based on the origin city and the destination city of the flight includes:
  dividing the part of the air freight rate data which is dividable by the sharding algorithm, based on the origin city and the destination city, into the data subsets having a quantity of m, where m is a positive integer;
  sorting the data subsets according to a descending order of a quantity of data pieces included in each data subset;
  adding acquired node configuration into a first preset list, where the node configuration includes a node name and a node address, and each data item in the first preset list has a structure of {the node name, the node address, a data-piece quantity, a data list};
  for each of the data subsets, copying the data pieces, of the air freight rate data, in said data subset into the data list corresponding to the smallest data-piece quantity in the first preset list, in a sequence same as storing the data pieces into the first-level cache, and deleting the copied data pieces from the data subset, until said data subset includes no data piece; and
  determining each data item in the first preset list as a piece of metadata, and combining each piece of metadata with the copy of the whole set, of the part of the air freight rate data which is not dividable by the sharding algorithm, to generate all data nodes of the data shards.

In an embodiment, the method further includes:
  copying a piece of the air freight rate data, which is stored in the second-level cache and accessed, into a preset second list;
  determining whether there is incremental data in the first-level cache, where the incremental data is for the accessed air freight rate data;
  reading the incremental data from the first-level cache, in response to determining that there is the incremental data in the first-level cache; and
  applying a preset fusion algorithm on the incremental data, to obtain a fusion result between the first-level cache and the second-level cache.

In an embodiment, the preset fusion algorithm includes: discarding a part of the incremental data, in response to an moment of an operation of the part of the incremental data being earlier than a first moment, where the accessed air freight rate data in the second-level cache is copied into the preset second list at the first moment; deteting data corresponding to the incremental data, from the second preset list, in response to an operation of the incremental data being deletion; modifying data corresponding to the incremental data, in the second preset list, in response to an operation of the incremental data being modification; and inserting data corresponding to the incremental data, into the second preset list, in response to an operation of the incremental data being insertion.

A system for caching air freight rate data is provided, including a transforming unit, a generating unit, and a storing unit.

The transforming unit is configured to transform the air freight rate data into a data format for a first-level cache, and store the transformed air freight rate data into the first-level cache.

The generating unit is configured to perform data sharding on the air freight rate data stored in the first-level cache, based on an origin city and a destination city of a flight, to generate data shards, where: each data node of the data shards includes a copy of a whole set, of a part of the air freight rate data which is not dividable by a sharding algorithm, and one of subsets, of a part of the air freight rate data which is dividable by the sharding algorithm; and all the subsets, of the part of the air freight rate data which is dividable by the sharding algorithm, constitute a whole set of the part of air freight rate data which is dividable by the sharding algorithm.

The storing unit is configured to committ the data shards, and store the committed data shards into a second-level cache.

In an embodiment, the generating unit includes a classifying subunit, a sorting subunit, an adding subunit, a data copying subunit, and a generating subunit.

The classifying subunit is configured to divide the part of the air freight rate data which is dividable by the sharding algorithm, based on the origin city and the destination city, into the data subsets having a quantity of m, where m is a positive integer.

The sorting subunit is configured to sort the data subsets according to a descending order of a quantity of data pieces included in each data subset.

The adding subunit is configured to add acquired node configuration into a first preset list, where the node configuration includes a node name and a node address, and each data item in the first preset list has a structure of {the node name, the node address, a data-piece quantity, a data list}.

The data copying subunit is configured to, for each of the data subsets, copy the data pieces, of the air freight rate data, in said data subset into the data list corresponding to the smallest data-piece quantity in the first preset list, in a sequence same as storing the data pieces into the first-level cache, and delete the copied data pieces from said data subset, until said data subset includes no data piece.

The generating subunit is configured to determine each data item in the first preset list as a piece of metadata, and combine each piece of metadata with the copy of the whole set, of the part of the air freight rate data which is not dividable by the sharding algorithm, to generate all data nodes of the data shards.

In an embodiment, the caching system further includes a copying unit, a determining unit, a reading unit, and a fusing unit.

The copying unit is configured to copy a piece of the air freight rate data, which is stored in the second-level cache and accessed, into a preset second list.

The determining unit is configured to determine whether there is incremental data in the first-level cache, where the incremental data is for the accessed air freight rate data.

The reading unit is configured to read the incremental data from the first-level cache, in response to the determining unit determining that there is the incremental data in the first-level cache.

The fusing unit is configured to apply a preset fusion algorithm on the incremental data, to obtain a fusion result between the first-level cache and the second-level cache.

As can be known from the above solutions, the method and the system for caching air freight rate data are provided according to embodiments of the present disclosure. The air freight rate data is first transformed into the data format for the first-level cache, and is then stored into the first-level cache. Afterwards, the data sharding is perfromed on the air freight rate data stored in the first-level cache, based on the origin city and the destination city of the flight, to generate the data shards. Each data node of the data shards includes the copy of the whole set, of the part of the air freight rate data which is not dividable by the sharding algorithm, and one of the subsets, of the part of the air freight rate data which is dividable by the sharding algorithm. All the subsets, of the part of the air freight rate data which is dividable by the sharding algorithm, constitute the whole set of the part of air freight rate data which is dividable by the sharding algorithm. The data shards is committed and then stored into the second-level cache. Each data node of the data shards stored into the second-level cache contains the copy of the whole set, of the part which is not dividable by the sharding algorithm, and one subset, of the part which is dividable by the sharding algorithm. That is, each data node includes only a portion of the part of the air freight rate data which is dividable by the sharding algorithm. Hence, horizontal scalability of caching systems can be improved in comparison with the conventional technology in which all cached data are copies of whole sets.

BRIEF DESCRIPTION OF THE DRAWINGS

For clearer illustration of the technical solutions according to embodiments of the present disclosure or conventional techniques, hereinafter briefly described are the drawings to be applied in embodiments of the present disclosure or conventional techniques. Apparently, the drawings in the following descriptions are only some embodiments of the present disclosure, and other drawings may be obtained by those skilled in the art based on the provided drawings without creative efforts.

DETAILED DESCRIPTION

Hereinafter technical solutions in embodiments of the present disclosure are described clearly and completely in conjunction with the drawings in embodiments of the present closure. Apparently, the described embodiments are only some rather than all of the embodiments of the present disclosure. Any other embodiments obtained based on the embodiments of the present disclosure by those skilled in the art without any creative effort fall within the scope of protection of the present disclosure.

A method and a system for caching air freight rate data are provided according to embodiments of the present disclosure. The air freight rate data is first transformed into a data format for a first-level cache, and is then stored into the first-level cache. Afterwards, data sharding is perfromed on the air freight rate data stored in the first-level cache, based on an origin city and a destination city of a flight, to generate data shards. Each data node of the data shards includes a copy of a whole set, of a part of the air freight rate data which is not dividable by the sharding algorithm, and one of subsets, of a part of the air freight rate data which is dividable by the sharding algorithm. All the subsets, of the part of the air freight rate data which is dividable by the sharding algorithm, constitute a whole set of the part of air freight rate data which is dividable by the sharding algorithm. The data shards is committed and then stored into a second-level cache. Each data node of the data shards stored into the second-level cache contains the copy of the whole set, of the part which is not dividable by the sharding algorithm, and one subset, of the part which is dividable by the sharding algorithm. That is, each data node includes only a portion of the part of the air freight rate data which is dividable by the sharding algorithm. Hence, horizontal scalability of caching systems can be improved in comparison with the conventional technology in which all cached data are copies of whole sets.

Figure 1:
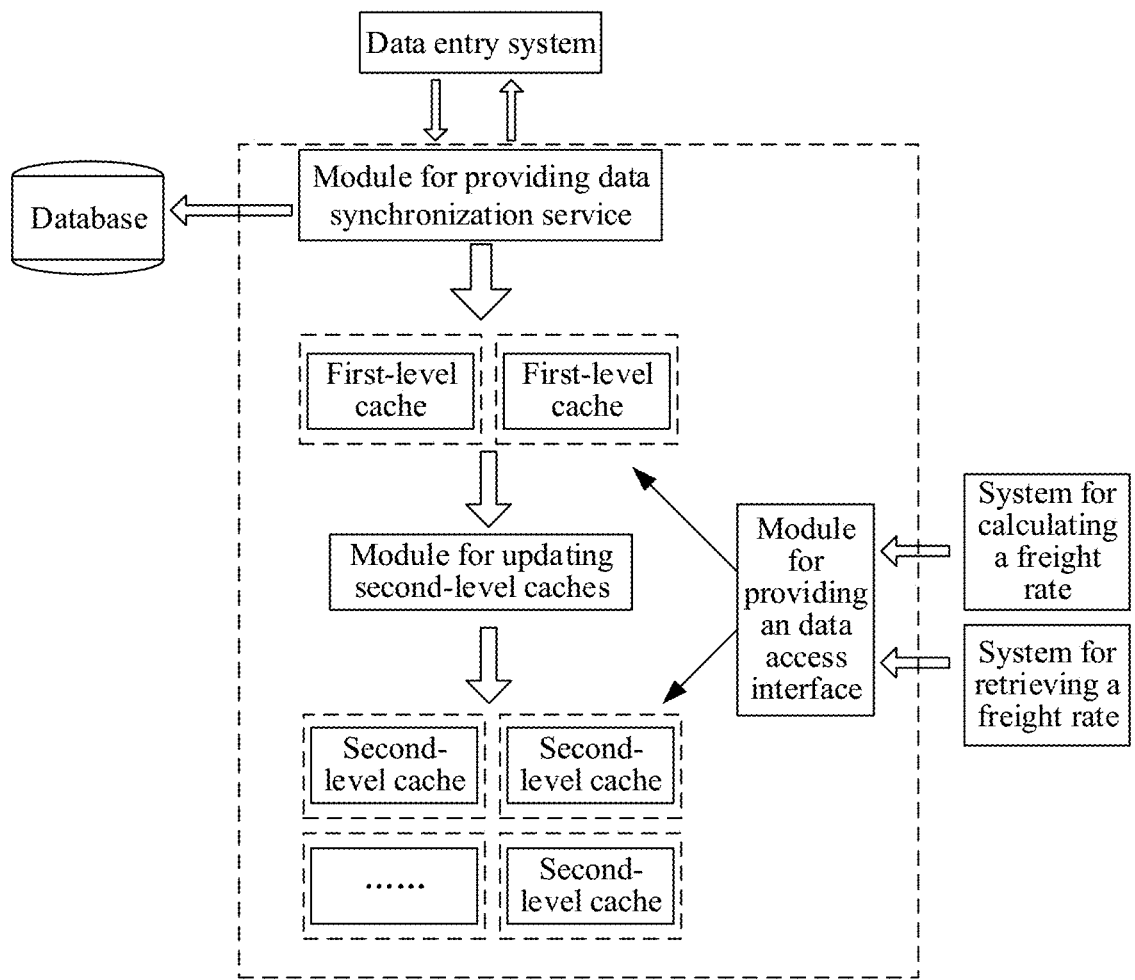
FIG. 1 is a diagram of distributed two-level cache architecture for a method for caching air freight data according to an embodiment of the present disclosure.

FIG. 1 is a diagram of distributed two-level cache architecture for a method for caching air freight data according to an embodiment of the present disclosure. In FIG. 1, dashed boxes 1 identify components of the distributed two-level cache architecture, which mainly includes a module for providing a data synchronization service, first-level caches, a module for updating second-level caches, second-level caches, and a module for providing a data access interface. The distributed two-level cache architecture includes two first-level caches and multiple second-level caches.

The module for providing the data synchronization service is connected to a data entry system and a database, and is mainly configured to: process data submission requests from an airline, analyze and process the submitted data, and then store the submitted data into a global data region and an incremental data region in the first-level cache.

The first-level cache is a key-value memory storage system, and may be implemented as a Redis cluster in an embodiment. Redis is a storage system which is journaled, key-value, high-performance, open-source, and is written in ANSI C language. Redis supports network functions, and may be either memory-based or persistent.

The module for updating second-level caches is mainly configured to distribute data on air ticket prices among nodes in the second-level cache cluster.

The module providing the data access interface is mainly implemented as a C++ runtime library, and provides an interface for accessing freight rate data to systems for calculating or retrieving a freight rate.

The second-level cache is a linear memory table, which may be implemented as a shared memory (Shm) under the Linux in an embodiment. The Shm is a Linux kernel-level shared memory, and serves a communication means among processes under the Linux.

Figure 2:
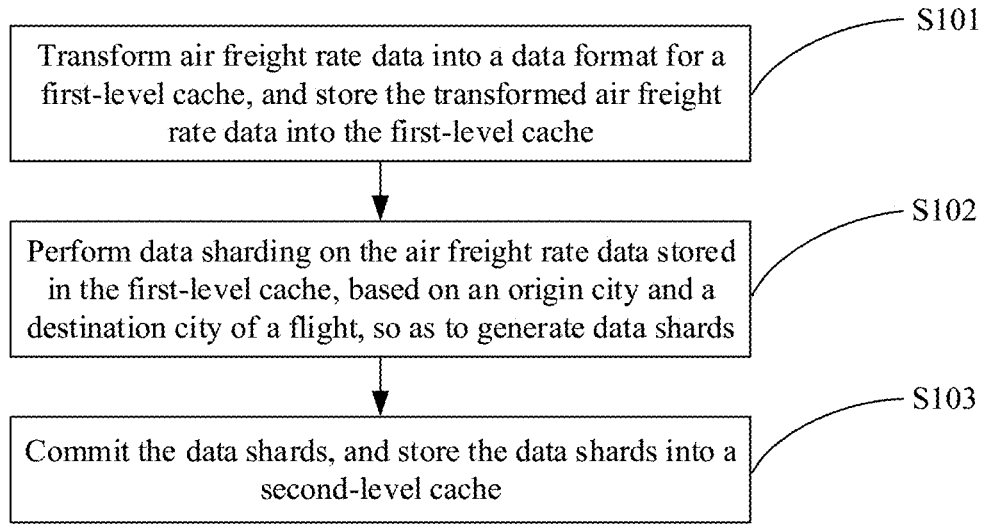
FIG. 2 is a flowchart of a method for caching air freight data according to an embodiment of the present disclosure.

Reference is made to FIG. 2, which is a flowchart of a method for caching air freight rate data according to an embodiment of the present disclosure. The method includes steps S101 to S103.

In step S101, the air freight rate data is transformed into a data format for a first-level cache, and the transformed air freight rate data is stored into the first-level cache.

From a perspective of business data standard, the air freight rate data is released by an airline, and consists of a ticket price and a series of rules that need to be satisfied for applying such ticket price.

From a perspective of data format, an origin city (or an airport of the origin city) and a destination city (or an airport of the destination city) of a flight are specified when releasing the ticket price. A table of the rules that need to be satisfied for apply such ticket price has a unique rule identifier (ID). Detailed data of a rule is associated with the table via the rule ID.

In essence, a main service of the systems for calculating or retrieving the freight rate is searching for a ticket price or a ticket service of a flight from an origin city (or an airport of the origin city) and a destination city (or an airport of the destination city). Therefore, the ticket price and the rules are mutually dependent. That is, it is necessary to check the rules when inquiring the ticket price, and the ticket price is integrated with and the rules. In order to implement an algorithm for data sharding, the ticket price, the table of the rules, and the detailed data on the rules should be integrated, othewise the required data would be incomplete when calculating or retrieving the ticket price.

Based on the above discussion, it is necessary to preprocess the ticket price, the table of the rules, and the detailed data on the rules, for implementing the algorithm for data sharding. Relevent data is combined according to embodiments of the present disclosure. Optionally, the ticket price, the table of the rules, and the detailed data on the rules are transformed into binary data and then stored in the first-level cache. Such process enables finding the table of the rules and the detailed data on the rules when searching for the ticket price. Not only a data enviroment is provided for the algorithm of data sharding, but also a frequency of accessing data is significantly reduced. Hence, a performance of the system is improved.

In step S102, data sharding is perfomed on the air freight rate data stored in the first-level cache, based on an origin city and a destination city of a flight, so as to generate data shards.

Each data node of the data shards includes a copy of a whole set, of a part of the air freight rate data which is not dividable by a sharding algorithm, and one of subsets, of a part of the air freight rate data which is dividable by the sharding algorithm. All the subsets, of the part of the air freight rate data which is dividable by the sharding algorithm, constitute a whole set of the part of air freight rate data which is dividable by the sharding algorithm.

In practice, the origin city and the destination city of the flight may be abbreviated as OD, in which "O" and "D" are abbreviations for the origin city and the destination city, respectively.

Data sharding means dividing a dataset, according to a certain rule, into data subsets which are mutually independent and orthogonal, and distributing the data subsets onto different data nodes.

In industry, there are three main modes of data sharding, i.e., hash mode, consistent-hash mode, and range-based mode. None of the three modes is optimal for the data sharding when considering a characteristic of freight rate calculation. The freight rate calculation is a service which searches a memory with high-frequency (as high as tens of thousands per unit time) single requests. A response to requests from users request may not be up to standard when using the above three modes. Hence, the data sharding is not applied in conventional technology. An essence of the systems of calculating or retrieving the freight rate is calculating or retrieving a ticket price based on the OD. During service processing, even the calculation or retrieval concerning connecting flights is implemented by dividing a journey into multiple ODs. Therefore, data sharding mode based on the OD is a more feasible solution, as applied in embodiments of the present disclosure.

Figure 3:
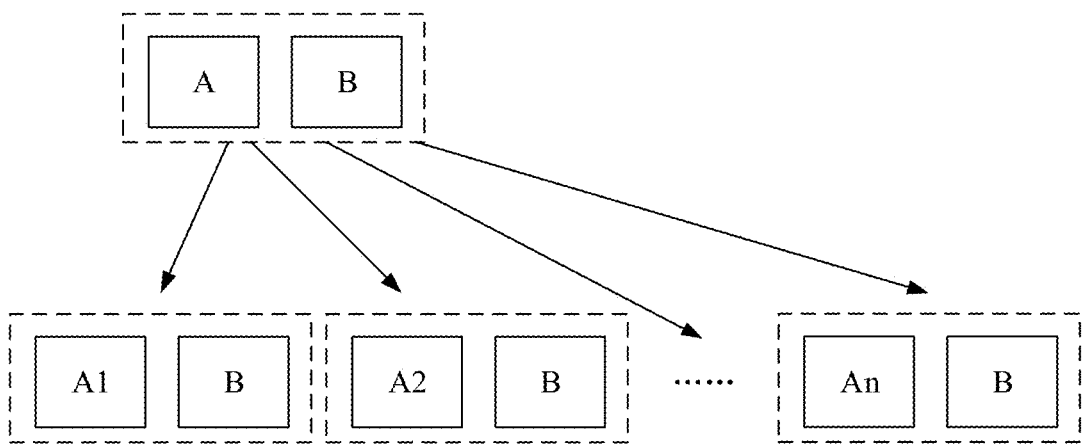
FIG. 3 is a schematic diagram of data sharding according to an embodiment of the present disclosure.

Referring is made to FIG. 3, which is a schematic diagram of data slicing according to an embodiment of the present disclosure. In FIG. 3, dataset A is a whole set of a part of the air freight rate data, and such part is dividable by a sharding algorithm. Dataset B is a whole set of another part of the air freight rate data, and such part is not dividable by the sharding algorithm. Subsets A1, A2, . . . , and An represent subsets of the dataset A, and are independent from and orthogonal to each other. After the data sharding, the subsets A1, A2, . . . , and An may be distributed onto data node 1, data node 2, . . . , and data node n, respectively. Each data node has a copy of the dataset B.

In step S103, the data shards are committed, and the committed data shards are stored into a second-level cache.

In summary, the method for caching air freight rate data is provided according to embodiments of the present disclosure. The air freight rate data is first transformed into the data format for the first-level cache, and is then stored into the first-level cache. Afterwards, the data sharding is perfromed on the air freight rate data stored in the first-level cache, based on the origin city and the destination city of the flight, to generate the data shards. Each data node of the data shards includes the copy of the whole set, of the part of the air freight rate data which is not dividable by the sharding algorithm, and one of the subsets, of the part of the air freight rate data which is dividable by the sharding algorithm. All the subsets, of the part of the air freight rate data which is dividable by the sharding algorithm, constitute the whole set of the part of air freight rate data which is dividable by the sharding algorithm. The data shards is committed and then stored into the second-level cache. Each data node of the data shards stored into the second-level cache contains the copy of the whole set, of the part which is not dividable by the sharding algorithm, and one subset, of the part which is dividable by the sharding algorithm. That is, each data node includes only a portion of the part of the air freight rate data which is dividable by the sharding algorithm. Hence, horizontal scalability of caching systems can be improved in comparison with the conventional technology in which all cached data are copies of whole sets.

In the foregoing embodiments, there are two situations of transforming the air freight rate data into the data format for the first-level cache, that is, when preprocessing the air freight rate data. A first situation is total-data processing, and a second situation is data processing during system operation.

Hereinafter the total-data processing is illustrated. Since a data structure for the first-level cache is different from that for the database, all the valid air freight rate data stored in the database needs to be cached in consistent with the data structure for the first-level cache when deployment of the system begins, to ensure normal operation of the system.

During preprocessing the total data, the module for providing the data synchronization service (see FIG. 1) is activated. When an configuration item bLoadAll in such module has a value of "1", the module reads a configuration file, and reads the air freight rate data from the database based on a sequence indicated by the configuration file. In a case that the air freight rate data does not need to be pre-processed, the module invokes a key-value generation engine directly to transform the air freight rate data into the data format for the first-level cache, and then invokes a data storage interface to store the transformed air freight rate data in the first-level cache. In a case that the air freight rate data needs to be pre-processed, the module generates a data object based on the air freight rate data, serialize the generated data object, then invokes the key-value engine to transform the serialized data object into the data format for the first-level cache, and then invokes the data storage interface to store the transfomed data in the first-level cache.

Hereinafter the data processing during system operation is illustrated. Each piece of air freight rate data inputted into the system is stored into the first-level cache, to ensure data integrity.

In the data processing during system operation, the module for providing the data synchronization service (see FIG. 1) receives a request for inputting data into the system. In a case that the air freight rate data does not need to be pre-processed, the module invokes a key-value generation engine directly to transform the air freight rate data into the data format for the first-level cache, and then invokes a data storage interface to store the transformed air freight rate data in the first-level cache. In a case that the air freight rate data needs to be pre-processed, the module generates a data object based on the air freight rate data, serialize the generated data object, then invokes the key-value engine to transform the serialized data object into the data format for the firs-level cache, and then invokes the data storage interface to store the transfomed data in the first-level cache.

In practice, the generated data and cached data, of the target data format, is optionally stored in a global data region and an incremental data region in the first-level cache.

Figure 4:
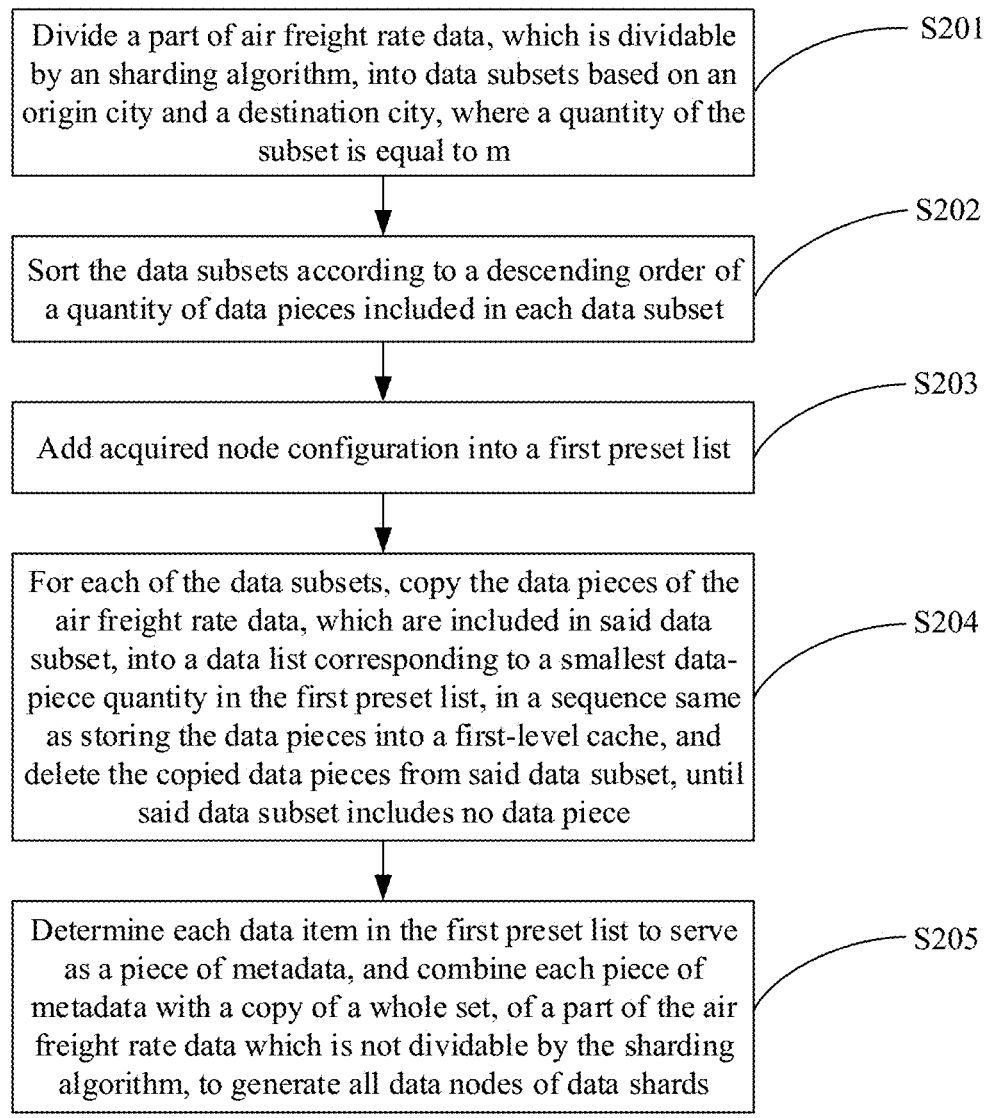
FIG. 4 is a flowchart of a process of performing data sharding on air freight rate data stored in a first-level cache, based on an origin city and a destination city of a flight, to generate data shards according to an embodiment of the present disclosure.

In order to further optimize the foregoing embodiment, reference is made to FIG. 4, which shows a flowchart of a process of performing data sharding on the air freight rate data stored in a first-level cache, based on an origin city and a destination city of a flight, to generate data shards according to an embodiment of the present disclosure. The process includes steps S201 to S205.

In step S201, the part of the air freight rate data, which is dividable by the sharding algorithm, is divided into the data subsets based on the origin city and the destination city, where a quantity of the subset is equal to m.

In each data subset, pieces of the air freight rate data has the identical origin city and the identical destination city. m is a positive integer.

In step S202, the data subsets are sorted according to a descending order of a quantity of data pieces included in each data subset.

The part of the air freight rate data, which is dividable by the sharding algorithm, is stored in the first-level cache in a table form. After such part of the air freight rate data is divided into m different subsets based on the origin city and the destination city, pieces of the air freight rate data included in each data subset is also stored based on the origin city and the destination city in a table form. Therefore, a quantity of data pieces included in each of the data subsets is also a quantity of the pieces of air freight rate data which have the identical origin city and the identical destination city.

In step S203, acquired node configuration is added into a first preset list.

The node configuration includes a node name and a node address, and each data item in the first preset list has a structure of {the node name, the node address, a data-piece quantity, a data list}.

In step S204, for each of the data subsets, the data pieces of the air freight rate data, which are included in said data subset, are copied into the data list corresponding to the smallest data-piece quantity in the first preset list, in a sequence same as storing the data pieces into the first-level cache, and the copied data pieces are deleted from said data subset. The above operations are performed until said data subset includes no data piece.

Each time the data pieces of the air freight rate data are copied into the data list that corresponds to the smallest data-piece quantity, such data-piece quantity is increased by one for each data piece.

In step S205, each data item in the first preset list is determined to serve as a piece of metadata, and each piece of metadata is combined with the copy of the whole set, of the part of the air freight rate data which is not dividable by the sharding algorithm, to generate all data nodes of the data shards.

In summary, each data node of the data shards stored into the second-level cache contains the copy of the whole set, of the part which is not dividable by the sharding algorithm, and one subset, of the part which is dividable by the sharding algorithm. That is, each data node includes only a portion of the part of the air freight rate data which is dividable by the sharding algorithm. Hence, horizontal scalability of caching systems can be improved in comparison with the conventional technology in which all cached data are copies of whole sets.

Those skilled in the art can appreciate that conventional methods for caching air ticket prices cannot implement real-time commitment of air freight rate data. In order to address such issue, data in the first-level cache and data in the second-level cache are fused on a basis of the foregoing embodiments. Thereby, the data stored in the second-level cache is valid on-stock data of the ticket prices, and the data stored in the first-level cache is the whole data of the ticket price and incremental data of the ticket price. The on-stock data and the incremental data are fused through a certain algorithm to form the total data of the ticket price, which addresses the issue concerning real-time commitment of the air freight rate data after a release.

In embodiments of the present disclosure, the fusion between the first-level cache and the second-level cache addresses the issue concerning a real-time capability of the air freight rate data after release. In an embodiment, an incremental operation is stored in the first-level cache. A data structure of the incremental operation stored in the first-level cache may be as shown in Table 1.

TABLE 1

| Field name | Meaning | Data type | Note |
|---|---|---|---|
| ID | ID number | Int64 | Auto-incrementing number |
| Operation | operation | string | I: insert<br>M: modify<br>D: delete |
| Table_name | name of table | string | |
| Version | version number | int | Identify a version, to address changes in table structure |
| Datakey | primary key of data | string | |
| OpeartionTime | time of operation | Int64 | Integral expression of time |
| Content | content | string | Serialized data entries |

The fusion between the first-level cache and the second-level cache is implemented in the module providing the data access interface.

Figure 5:
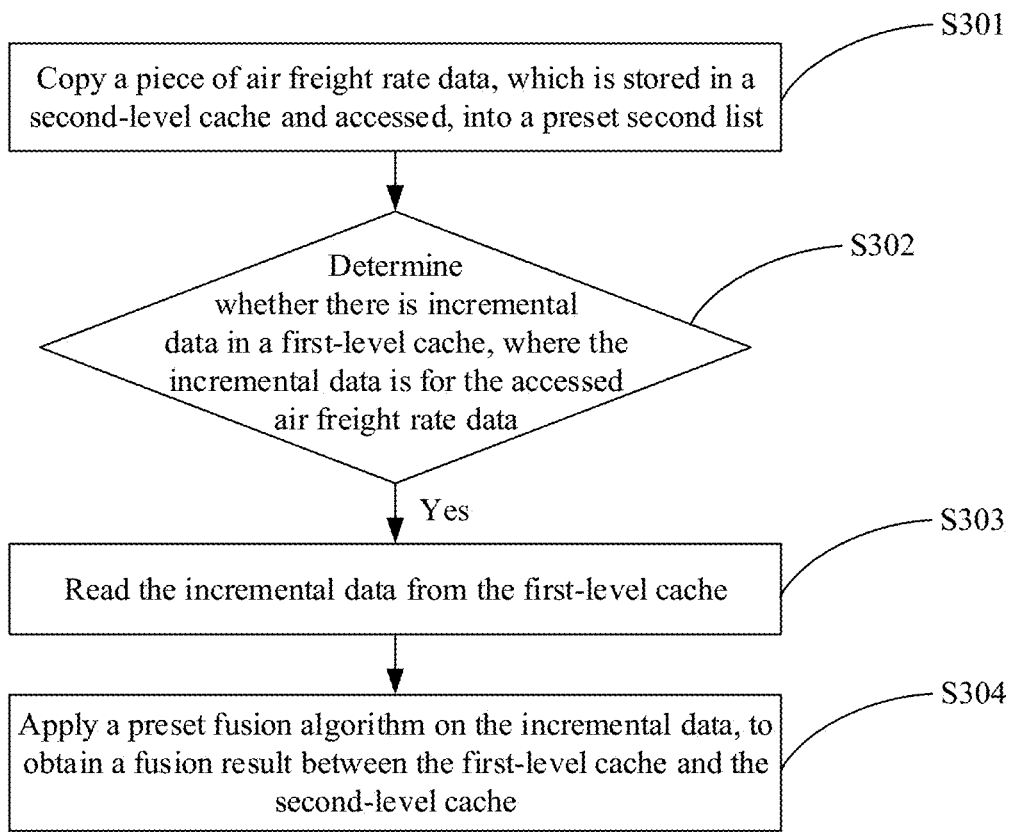
FIG. 5 is a flowchart of a process of fusing data in a first-level cache and a second-level cache according to an embodiment of the present disclosure.

Reference is made to FIG. 5, which is a flowchart of a process of fusing data in a first-level cache and a second-level cache according to an embodiment of the present disclosure. The process includes steps S301 to S304.

In step S301, a piece of the air freight rate data, which is stored in the second-level cache and accessed, is copied into a preset second list.

In step S302, it is determined whether there is incremental data in the first-level cache, where the incremental data is for the accessed air freight rate data. The process proceeds to step S303 when it is determined that there is the incremental data.

In step S303, the incremental data is read from the first-level cache.

In step S304, a preset fusion algorithm is applied on the incremental data, to obtain a fusion result between the first-level cache and the second-level cache.

The preset fusion algorithm includes following steps. A part of the incremental data is discarded, in response to an moment of an operation of the part of the incremental data being earlier than a first moment. The first moment is a moment at which the accessed air freight rate data in the second-level cache is copied into the preset second list. Data corresponding to the incremental data is deleted from the second preset list, in response to an operation of the incremental data being deletion. Data corresponding to the incremental data is modified in the second preset list, in response to an operation of the incremental data being modification. Data corresponding to the incremental data is inserted into the second preset list, in response to an operation of the incremental data being insertion.

A timer may be set in the module for providing the data synchronization service module, for discarding the incremental data. All expired incremental data are deleted based on timing that is confiugured by the timer.

Corresponding to the foregoing method embodiments, a system for caching air freight rate data is further provided according to embodiments of the present disclosure.

Figure 6:
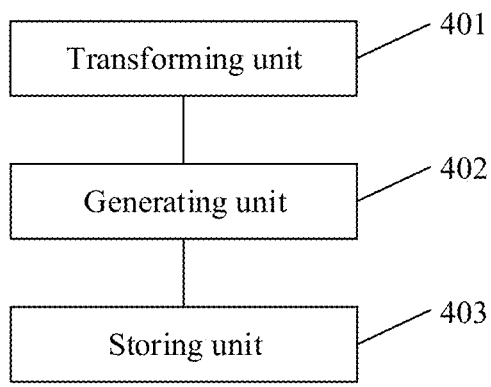
FIG. 6 is a schematic structural diagram of a system for caching air freight data according to an embodiment of the present disclosure.

Reference is made to FIG. 6, which is a schematic structural diagram of a system for caching air freight rate data according to an embodiment of the present disclosure. The system includes a transforming unit 401, a generating unit 402, and a storing unit 403.

The transforming unit 401 is configured to transform the air freight rate data into a data format for a first-level cache, and store the transformed air freight rate data into the first-level cache.

From a perspective of business data standard, the air freight rate data is released by an airline, and consists of a ticket price and a series of rules that need to be satisfied for applying such ticket price.

From a perspective of data format, an origin city (or an airport of the origin city) and a destination city (or an airport of the destination city) of a flight are specified when releasing the ticket price. A table of the rules that need to be satisfied for apply such ticket price has a unique rule identifier (ID). Detailed data of a rule is associated with the table via the rule ID.

In essence, a main service of the systems for calculating or retrieving the freight rate is searching for a ticket price or a ticket service of a flight from an origin city (or an airport of the origin city) and a destination city (or an airport of the destination city). Therefore, the ticket price and the rules are mutually dependent. That is, it is necessary to check the rules when inquiring the ticket price, and the ticket price is integrated with and the rules. In order to implement an algorithm for data sharding, the ticket price, the table of the rules, and the detailed data on the rules should be integrated, otherwise the required data would be incomplete when calculating or retrieving the ticket price.

Based on the above discussion, it is necessary to pre-process the ticket price, the table of the rules, and the detailed data on the rules, for implementing the algorithm for data sharding. Relevent data is combined according to embodiments of the present disclosure. Optionally, the ticket price, the table of the rules, and the detailed data on the rules are transformed into binary data and then stored in the first-level cache. Such process enables finding the table of the rules and the detailed data on the rules when searching for the ticket price. Not only a data environment is provided for the algorithm of data sharding, but also a frequency of accessing data is significantly reduced. Hence, a performance of the system is improved.

The generating unit 402 is configured to perform data sharding on the air freight rate data stored in the first-level cache, based on an origin city and a destination city of a flight, so as to generate data shards.

Each data node of the data shards includes a copy of a whole set, of a part of the air freight rate data which is not dividable by a sharding algorithm, and one of subsets, of a part of the air freight rate data which is dividable by the sharding algorithm. All the subsets, of the part of the air freight rate data which is dividable by the sharding algorithm, constitute a whole set of the part of air freight rate data which is dividable by the sharding algorithm.

The storage unit 403 is configured to commit the data shards, and store the committed data shards into a second-level cache.

In summary, the system for caching air freight rate data is provided according to embodiments of the present disclosure. The air freight rate data is first transformed into the data format for the first-level cache, and is then stored into the first-level cache. Afterwards, the data sharding is perfromed on the air freight rate data stored in the first-level cache, based on the origin city and the destination city of the flight, to generate the data shards. Each data node of the data shards includes the copy of the whole set, of the part of the air freight rate data which is not dividable by the sharding algorithm, and one of the subsets, of the part of the air freight rate data which is dividable by the sharding algorithm. All the subsets, of the part of the air freight rate data which is dividable by the sharding algorithm, constitute the whole set of the part of air freight rate data which is dividable by the sharding algorithm. The data shards is committed and then stored into the second-level cache. Each data node of the data shards stored into the second-level cache contains the copy of the whole set, of the part which is not dividable by the sharding algorithm, and one subset, of the part which is dividable by the sharding algorithm. That is, each data node includes only a portion of the part of the air freight rate data which is dividable by the sharding algorithm. Hence, horizontal scalability of caching systems can be improved in comparison with the conventional technology in which all cached data are copies of whole sets.

In the foregoing embodiments, there are two situations of transforming the air freight rate data into the data format for the first-level cache, that is, when preprocessing the air freight rate data. A first situation is total-data processing, and a second situation is data processing during system operation.

Hereinafter the total-data processing is illustrated. Since a data structure for the first-level cache is different from that for the database, all the valid air freight rate data stored in the database needs to be cached in consistent with the data structure for the first-level cache when deployment of the system begins, to ensure normal operation of the system.

During preprocessing the total data, the module for providing the data synchronization service (see FIG. 1) is activated. When an configuration item bLoadAll in such module has a value of "1", the module reads a configuration file, and reads the air freight rate data from the database based on a sequence indicated by the configuration file. In a case that the air freight rate data does not need to be pre-processed, the module invokes a key-value generation engine directly to transform the air freight rate data into the data format for the first-level cache, and then invokes a data storage interface to store the transformed air freight rate data in the first-level cache. In a case that the air freight rate data needs to be pre-processed, the module generates a data object based on the air freight rate data, serialize the generated data object, then invokes the key-value engine to transform the serialized data object into the data format for the firs-level cache, and then invokes the data storage interface to store the transfomed data in the first-level cache.

Hereinafter the data processing during system operation is illustrated. Each piece of air freight rate data inputted into the system is stored into the first-level cache, to ensure data integrity.

In the data processing during system operation, the module for providing the data synchronization service (see FIG. 1) receives a request for inputting data into the system. In a case that the air freight rate data does not need to be pre-processed, the module invokes a key-value generation engine directly to transform the air freight rate data into the data format for the first-level cache, and then invokes a data storage interface to store the transformed air freight rate data in the first-level cache. In a case that the air freight rate data needs to be pre-processed, the module generates a data object based on the air freight rate data, serialize the generated data object, then invokes the key-value engine to transform the serialized data object into the data format for the firs-level cache, and then invokes the data storage interface to store the transfomed data in the first-level cache.

In practice, the generated data and cached data, of the target data format, is optionally stored in a global data region and an incremental data region in the first-level cache.

In order to further optimize the foregoing embodiment, the generating unit 402 in the foregoing embodiment specifically includes a classifying subunit, a sorting subunit, an adding subunit, a data copying subunit, and a generating subunit.

The classifying subunit is configured to divide the part of the air freight rate data which is dividable by the sharding algorithm, based on the origin city and the destination city, into the data subsets. A quantity of the data subsets is equal to m, and m is a positive integer.

The sorting subunit is configured to sort the data subsets according to a descending order of a quantity of data pieces included in each data subset.

The adding subunit is configured to add acquired node configuration into a first preset list. The node configuration includes a node name and a node address. Each data item in the first preset list has a structure of {the node name, the node address, a data-piece quantity, a data list}.

The data copying subunit is configured to, for each of the data subsets: copy the data pieces, of the air freight rate data, in said data subset into the data list corresponding to the smallest data-piece quantity in the first preset list, in a sequence same as storing the data pieces into the first-level cache; and delete the copied data pieces from said data subset. The above operations are performed until said data subset includes no data piece.

Each time the data pieces of the air freight rate data are copied into the data list that corresponds to the smallest data-piece quantity, such data-piece quantity is increased by one for each data piece.

The generating subunit is configured to determine that each data item in the first preset list serves as a piece of metadata, and combine each piece of metadata with the copy of the whole set, of the part of the air freight rate data which is not dividable by the sharding algorithm, to generate all data nodes of the data shards.

In summary, each data node of the data shards stored into the second-level cache contains the copy of the whole set, of the part which is not dividable by the sharding algorithm, and one subset, of the part which is dividable by the sharding algorithm. That is, each data node includes only a portion of the part of the air freight rate data which is dividable by the sharding algorithm. Hence, horizontal scalability of caching systems can be improved in comparison with the conventional technology in which all cached data are copies of whole sets.

Those skilled in the art can appreciate that conventional methods for caching air ticket prices cannot implement real-time commitment of air freight rate data. In order to address such issue, data in the first-level cache and data in the second-level cache are fused on a basis of the foregoing embodiments. Thereby, the data stored in the second-level cache is valid on-stock data of the ticket prices, and the data stored in the first-level cache is the whole data of the ticket price and incremental data of the ticket price. The on-stock data and the incremental data are fused through a certain algorithm to form the total data of the ticket price, which addresses the issue concerning real-time commitment of the air freight rate data after a release.

Therefore, in order to further optimize the foregoing embodiment, the data caching system may further include a copying unit, a determining unit, a reading unit, and an fusing unit.

The copying unit is configured to copy a piece of the air freight rate data, which is stored in the second-level cache and accessed, into a preset second list.

The determining unit is configured to determine whether there is incremental data in the first-level cache, where the incremental data is for the accessed air freight rate data.

The reading unit is configured to read the incremental data from the first-level cache, in response to the determining unit determining that there is the incremental data in the first-level cache.

The fusing unit is configured to apply a preset fusion algorithm on the incremental data, to obtain a fusion result between the first-level cache and the second-level cache.

The preset fusion algorithm includes following steps. A part of the incremental data is discarded, in response to an moment of an operation of the part of the incremental data being earlier than a first moment. The first moment is a moment at which the accessed air freight rate data in the second-level cache is copied into the preset second list. Data corresponding to the incremental data is deleted from the second preset list, in response to an operation of the incremental data being deletion. Data corresponding to the incremental data is modified in the second preset list, in response to an operation of the incremental data being modification. Data corresponding to the incremental data is inserted into the second preset list, in response to an operation of the incremental data being insertion.

A timer may be set in the module for providing the data synchronization service module, for discarding the incremental data. All expired incremental data are discarded based on timing that is configured by the timer.

Specific working principles of components in the system embodiments may refer to corresponding parts in the method embodiments, and are not repeated herein.

It should be noted that, the relationship terms such as "first", "second" and the like are only used herein to distinguish one entity or operation from another, rather than to necessitate or imply that an actual relationship or order exists between the entities or operations. Furthermore, the terms such as "include", "comprise" or any other variants thereof means to be non-exclusive. Therefore, a process, a method, an article or a device including a series of elements include not only the disclosed elements but also other elements that are not clearly enumerated, or further include inherent elements of the process, the method, the article or the device. Unless expressively limited, the statement "including a . . . " does not exclude the case that other similar elements may exist in the process, the method, the article or the device other than enumerated elements.

The embodiments of the present disclosure are described in a progressive manner, and each embodiment places emphasis on the difference from other embodiments. Therefore, one embodiment can refer to other embodiments for the same or similar parts.

According to the description of the disclosed embodiments, those skilled in the art can implement or use the present disclosure. Various modifications made to these embodiments may be obvious to those skilled in the art, and the general principle defined herein may be implemented in other embodiments without departing from the spirit or scope of the present disclosure. Therefore, the present disclosure is not limited to the embodiments described herein but confirms to a widest scope in accordance with principles and novel features disclosed in the present disclosure.

The invention claimed is:

1. A method for caching air freight rate data, comprising:
   transforming the air freight rate data into a data format for a first-level cache, and storing the transformed air freight rate data into the first-level cache;
   performing data sharding on the air freight rate data stored in the first-level cache, based on an origin city and a destination city of a flight, to generate data shards, wherein:
      each data node of the data shards includes a copy of a whole set, of a part of the air freight rate data which is not dividable by a sharding algorithm, and one of subsets, of a part of the air freight rate data which is dividable by the sharding algorithm; and
      all the subsets, of the part of the air freight rate data which is dividable by the sharding algorithm, constitute a whole set of the part of air freight rate data which is dividable by the sharding algorithm; and
   committing the data shards, and storing the committed data shards into a second-level cache;
   wherein performing the data sharding on the air freight rate data stored in the first-level cache based on the origin city and the destination city of the flight comprises:
      dividing the part of the air freight rate data which is dividable by the sharding algorithm, based on the origin city and the destination city, into data subsets having a quantity of m, wherein m is a positive integer;
      adding acquired node configuration into a first preset list, wherein the node configuration comprises a node name and a node address, and each data item in the first preset list has a structure of {the node name, the node address, a data-piece quantity, a data list};

for each of the data subsets,
copying the data pieces, of the air freight rate data, in said data subset into the data list corresponding to the smallest data-piece quantity in the first preset list, in a sequence same as storing the data pieces into the first-level cache, and deleting the copied data pieces from said data subset, until said data subset comprises no data piece; and determining each data item in the first preset list as a piece of metadata, and combining each piece of metadata with the copy of the whole set, of the part of the air freight rate data which is not dividable by the sharding algorithm, to generate all data nodes of the data shards.

2. The method according to claim 1, wherein the first-level cache is a Redis cluster.

3. The method according to claim 1, wherein the second-level cache is a Linux kernel-level shared memory.

4. The method according to claim 1, wherein after the dividing, the method further comprises:
sorting the data subsets according to a descending order of a quantity of data pieces comprised in each data subset.

5. The method according to claim 1, further comprising:
copying a piece of the air freight rate data, which is stored in the second-level cache and accessed, into a preset second list;
determining there is incremental data in the first-level cache, wherein the incremental data is for the accessed air freight rate data;
reading the incremental data from the first-level cache, in response to determining that there is the incremental data in the first-level cache; and
applying a preset fusion algorithm on the incremental data, to obtain a fusion result between the first-level cache and the second-level cache.

6. The method according to claim 5, wherein the preset fusion algorithm comprises:
discarding a part of the incremental data, in response to a moment of an operation of the part of the incremental data being earlier than a first moment, wherein the accessed air freight rate data in the second-level cache is copied into the preset second list at the first moment;
deleting data corresponding to the incremental data, from the second preset list, in response to an operation of the incremental data being deletion;
modifying data corresponding to the incremental data, in the second preset list, in response to an operation of the incremental data being modification; and
inserting data corresponding to the incremental data, into the second preset list, in response to an operation of the incremental data being insertion.

7. A system for caching air freight rate data, comprising:
a memory storing computer-readable instructions; and
a processor, wherein the computer-readable instructions when executed by the processor configure the process to perform the steps of:
transforming the air freight rate data into a data format for a first-level cache, and storing the transformed air freight rate data into the first-level cache;
performing data sharding on the air freight rate data stored in the first-level cache, based on an origin city and a destination city of a flight, to generate data shards, wherein:
each data node of the data shards includes a copy of a whole set, of a part of the air freight rate data which is not dividable by a sharding algorithm, and one of subsets, of a part of the air freight rate data which is dividable by the sharding algorithm; and
all the subsets, of the part of the air freight rate data which is dividable by the sharding algorithm, constitute a whole set of the part of air freight rate data which is dividable by the sharding algorithm; and
committing the data shards, and storing the committed data shards into a second-level cache;

wherein performing the data sharding on the air freight rate data stored in the first-level cache based on the origin city and the destination city of the flight comprises:
dividing the part of the air freight rate data which is dividable by the sharding algorithm, based on the origin city and the destination city, into data subsets having a quantity of m, wherein m is a positive integer;
adding acquired node configuration into a first preset list, wherein the node configuration comprises a node name and a node address, and each data item in the first preset list has a structure of {the node name, the node address, a data-piece quantity, a data list};

for each of the data subsets,
copying the data pieces, of the air freight rate data, in said data subset into the data list corresponding to the smallest data-piece quantity in the first preset list, in a sequence same as storing the data pieces into the first-level cache, and deleting the copied data pieces from said data subset, until said data subset comprises no data piece; and determining each data item in the first preset list as a piece of metadata, and combining each piece of metadata with the copy of the whole set, of the part of the air freight rate data which is not dividable by the sharding algorithm, to generate all data nodes of the data shards.

8. The system according to claim 7, wherein after the dividing, the method further comprises:
sorting the data subsets according to a descending order of a quantity of data pieces comprised in each data subset.

9. The caching system according to claim 7, wherein the computer-readable instructions when executed by the processor further configure the process to perform the steps of:
copying a piece of the air freight rate data, which is stored in the second-level cache and accessed, into a preset second list;
determining whether there is incremental data in the first-level cache, wherein the incremental data is for the accessed air freight rate data;
reading the incremental data from the first-level cache, in response to determining that there is the incremental data in the first-level cache; and
applying a preset fusion algorithm on the incremental data, to obtain a fusion result between the first-level cache and the second-level cache.

10. The system according to claim 7, wherein the first-level cache is a Redis cluster.

11. The system according to claim 7, wherein the second-level cache is a Linux kernel-level shared memory.

12. The system according to claim 9, wherein the preset fusion algorithm comprises:
discarding a part of the incremental data, in response to a moment of an operation of the part of the incremental data being earlier than a first moment, wherein the accessed air freight rate data in the second-level cache is copied into the preset second list at the first moment;

deleting data corresponding to the incremental data, from the second preset list, in response to an operation of the incremental data being deletion;

modifying data corresponding to the incremental data, in the second preset list, in response to an operation of the incremental data being modification; and inserting data corresponding to the incremental data, into the second preset list, in response to an operation of the incremental data being insertion.

13. A method for caching air freight rate data, comprising:

transforming the air freight rate data into a data format for a first-level cache, and storing the transformed air freight rate data into the first-level cache;

performing data sharding on the air freight rate data stored in the first-level cache, based on an origin city and a destination city of a flight, to generate data shards, wherein:

each data node of the data shards includes a copy of a whole set, of a part of the air freight rate data which is not dividable by a sharding algorithm, and one of subsets, of a part of the air freight rate data which is dividable by the sharding algorithm; and all the subsets, of the part of the air freight rate data which is dividable by the sharding algorithm, constitute a whole set of the part of air freight rate data which is dividable by the sharding algorithm; and committing the data shards, and storing the committed data shards into a second-level cache;

wherein the method further comprises:

copying a piece of the air freight rate data, which is stored in the second-level cache and accessed, into a preset second list;

determining there is incremental data in the first-level cache, wherein the incremental data is for the accessed air freight rate data;

reading the incremental data from the first-level cache, in response to determining that there is the incremental data in the first-level cache; and applying a preset fusion algorithm on the incremental data, to obtain a fusion result between the first-level cache and the second-level cache.

14. A system for caching air freight rate data, comprising:

a memory storing computer-readable instructions; and a processor, wherein the computer-readable instructions when executed by the processor configure the processor to perform the method according to claim 13.

* * * * *